(12) United States Patent
Kleeberger (10) Patent No.: US 8,172,465 B2
(45) Date of Patent: May 8, 2012

(54) DEVICES AND ASSOCIATED METHODS FOR FURCATING FIBER OPTIC CABLES

(75) Inventor: Terry M. Kleeberger, Tacoma, WA (US)

(73) Assignee: NetIG LLC, Kent, WA (US)

( * ) Notice: Subject to any disclaimer, the term of this patent is extended or adjusted under 35 U.S.C. 154(b) by 385 days.

(21) Appl. No.: 12/579,341

(22) Filed: Oct. 14, 2009

(65) Prior Publication Data

US 2010/0098386 A1 Apr. 22, 2010

Related U.S. Application Data

(60) Provisional application No. 61/274,100, filed on Oct. 17, 2008.

(51) Int. Cl.
*G02B 6/36* (2006.01)
*G02B 6/00* (2006.01)
*G02B 6/44* (2006.01)

(52) U.S. Cl. ............... 385/76; 385/86; 385/89; 385/92; 385/134; 385/137

(58) Field of Classification Search ................. None
See application file for complete search history.

(56) References Cited

U.S. PATENT DOCUMENTS

| | | | | |
|---|---|---|---|---|
| 4,339,171 A | * | 7/1982 | Makuch et al. | 385/87 |
| 4,447,120 A | * | 5/1984 | Borsuk | 385/136 |
| 4,626,067 A | * | 12/1986 | Watson | 385/86 |
| 4,795,229 A | * | 1/1989 | Abendschein et al. | 385/87 |
| 4,815,810 A | * | 3/1989 | Betzler et al. | 385/81 |
| 4,826,277 A | | 5/1989 | Weber et al. | |
| 4,884,862 A | | 12/1989 | Kofod | |
| 4,948,222 A | * | 8/1990 | Corke et al. | 385/100 |
| 4,989,945 A | | 2/1991 | Ohkura | |
| 5,048,918 A | | 9/1991 | Daems et al. | |
| 5,140,661 A | * | 8/1992 | Kerek | 385/81 |
| 5,185,840 A | * | 2/1993 | Iapicco | 385/100 |
| 5,199,095 A | * | 3/1993 | Iapicco | 385/100 |
| 5,231,688 A | | 7/1993 | Zimmer | |
| 5,239,609 A | | 8/1993 | Auteri | |
| 5,335,304 A | | 8/1994 | Smith et al. | |
| 5,371,827 A | * | 12/1994 | Szegda | 385/136 |
| 5,473,718 A | | 12/1995 | Sommer | |
| 5,491,766 A | * | 2/1996 | Huynh et al. | 385/100 |
| 5,514,055 A | * | 5/1996 | Elliott | 482/92 |
| 5,559,917 A | * | 9/1996 | Ott | 385/86 |

(Continued)

OTHER PUBLICATIONS

"#311 BNC Crimp Connector," CZ Labs Termination Instructions, the crimp technology disclosed is believed to be approximately 30 years or more old.

(Continued)

*Primary Examiner* — Rhonda Peace (57) ABSTRACT

A fiber optic cable assembly is provided. The cable assembly includes a housing, a plurality of furcation tubes, and a bundled cable. The housing has an opening at a first end and a plurality of channels at a second end. The furcation tubes are aligned with corresponding channels. One end of the bundled cable extends into an interior space of the housing through the opening. The bundled cable has a cable jacket and cable filaments. A first portion of the cable filaments extends beyond the end of the cable jacket into the interior space. A plurality of optic fibers is disposed in the bundled cable and the housing, and a molding compound is disposed around the furcation unit. Individual optic fibers are located in individual furcation tubes and capable of sliding longitudinally relative to the housing.

19 Claims, 8 Drawing Sheets

U.S. PATENT DOCUMENTS

| | | | | |
|---|---|---|---|---|
| 5,615,293 | A * | 3/1997 | Sayegh | 385/102 |
| 5,745,633 | A * | 4/1998 | Giebel et al. | 385/136 |
| 5,838,861 | A | 11/1998 | Bunde | |
| 5,892,871 | A * | 4/1999 | Dahan et al. | 385/86 |
| 5,895,079 | A * | 4/1999 | Carstensen et al. | 285/333 |
| 5,903,693 | A | 5/1999 | Brown | |
| 5,915,055 | A | 6/1999 | Bennett et al. | |
| 5,970,195 | A * | 10/1999 | Brown | 385/100 |
| 6,049,647 | A * | 4/2000 | Register et al. | 385/101 |
| 6,278,831 | B1 | 8/2001 | Henderson et al. | |
| 6,356,690 | B1 * | 3/2002 | McAlpine et al. | 385/109 |
| 6,389,214 | B1 * | 5/2002 | Smith et al. | 385/136 |
| 6,400,873 | B1 * | 6/2002 | Gimblet et al. | 385/102 |
| 6,419,399 | B1 * | 7/2002 | Loder et al. | 385/53 |
| 6,421,495 | B1 * | 7/2002 | Hoffmeister et al. | 385/139 |
| 6,438,299 | B1 * | 8/2002 | Brown et al. | 385/100 |
| 6,485,196 | B2 * | 11/2002 | Shiino et al. | 385/87 |
| 6,496,625 | B1 * | 12/2002 | Falkowich et al. | 385/100 |
| 6,519,395 | B1 * | 2/2003 | Bevan et al. | 385/100 |
| 6,556,754 | B2 * | 4/2003 | Simmons et al. | 385/121 |
| 6,769,817 | B2 * | 8/2004 | Saito et al. | 385/90 |
| 7,054,536 | B2 | 5/2006 | Sun | |
| 7,093,984 | B2 | 8/2006 | Cox | |
| 7,270,485 | B1 | 9/2007 | Robinson et al. | |
| 7,494,284 | B2 | 2/2009 | Robinson et al. | |
| 2002/0122653 | A1 * | 9/2002 | Donaldson et al. | 385/138 |
| 2003/0021575 | A1 * | 1/2003 | Werkheiser et al. | 385/139 |
| 2003/0063867 | A1 * | 4/2003 | McDonald et al. | 385/78 |
| 2003/0063868 | A1 * | 4/2003 | Fentress | 385/78 |
| 2003/0063869 | A1 * | 4/2003 | Elkins et al. | 385/87 |
| 2003/0147604 | A1 | 8/2003 | Tapia et al. | |
| 2005/0053341 | A1 | 3/2005 | Zimmel | |

OTHER PUBLICATIONS

"Connector Kit, Dualan Cable, AMP FSD," Tyco Electronics product drawing, publication date unclear but appears to be circa 2006.

"Pre-Terminated Multi-Fiber Cables," Berk-Tek product brochure, accessed Feb. 7, 2006.

* cited by examiner

DEVICES AND ASSOCIATED METHODS FOR FURCATING FIBER OPTIC CABLES

RELATED APPLICATION

The present application claims priority to U.S. Provisional Patent Application Ser. No. 61/274,100, accorded a filing date of Oct. 17, 2008, and entitled "Devices and Associated Methods for Furcating Fiber Optic Cables" which was converted on May 28, 2009 from U.S. Non-Provisional patent application Ser. No. 12/253,722, filed on Oct. 17, 2008, and entitled "Devices and Associated Methods for Furcating Fiber Optic Cables."

TECHNICAL FIELD

The present application relates to devices, assemblies, and methods for furcating fiber optic cables.

BACKGROUND OF THE INVENTION

Fiber optic cables are frequently used for interconnecting computer systems (e.g., servers) because these cables can simultaneously carry a large amount of data without excessive transmission loss. A trunkline is a type of fiber optic cable that typically includes multiple optic fibers and strength filaments (e.g., Kevlar yarns) arranged lengthwise and encased in a protective jacket (e.g., plastic or metal tubing). At each end of the trunkline, the optic fibers are furcated into individual cables that terminate at individual connectors.

Figure 1:
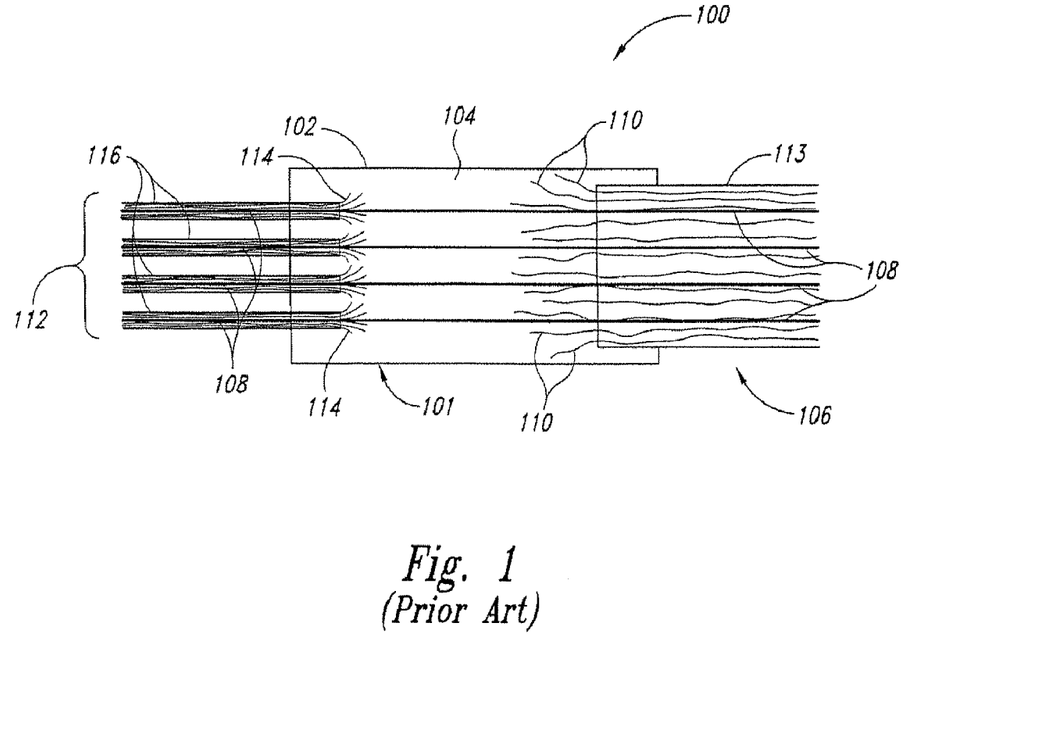
FIG. 1 is a cross-sectional view of a furcated cable in accordance with the prior art.

One conventional technique for furcating the trunkline uses heat-shrink tubing and epoxy. FIG. 1, for example, illustrates a prior art furcated cable 100 having a furcation unit 101 with a heat-shrink tube 102 encasing an epoxy 104, a trunkline 106 connected to one end of the furcation unit 101, and furcation tubes 112 projecting from the other end of the furcation unit 101. The trunkline 106 includes a cable jacket 113 encasing portions of optic fibers 108 and cable filaments 110. Each furcation tube 112 includes a tube jacket 116 encasing tube filaments 114 and one of the optic fibers 108. The heat-shrink tube 102 overlaps both the trunkline 106 and the furcation tubes 112 to enclose a portion of the optic fibers 108 and filaments 110 and 114. The epoxy 104 rigidly binds the enclosed optic fibers 108 and filaments 110 and 114 inside the heat-shrink tube 102. Each optic fiber 108 extends from the trunkline 106, through the epoxy 104, and out from the furcation tubes 112.

There are a number of drawbacks associated with the cable 100 described above. First, the furcation tubes 112 can occupy a considerable amount of space inside the heat-shrink tube 102 such that the heat-shrink tube 102 may not be able to accommodate a large number of furcation tubes. Furthermore, the optic fibers 108 can easily be damaged during installation, manufacturing, and other handling processes. For example, installing the furcated cable 100 typically includes pulling on the cable jacket 113 to draw the trunkline 106 through cable trays, conduits, and other channelways. The furcation unit 101 transmits the pulling force directly onto the optic fibers 108 because the epoxy 104 rigidly binds the optic fibers 108 to the cable jacket 113. The transmitted force can damage the fragile optic fibers 108.

Another conventional technique for furcating the trunkline uses insertion-type connectors, such as the UniCam® MTP® connectors manufactured by Corning Cable Systems of Hickory, N.C. One drawback associated with this type of connector is insertion loss. For example, a 10-gigabit system today typically has a transmission-loss budget of about 2.8 dB. An insertion-type connector typically incurs a transmission loss of approximately 0.5 dB to 1.0 dB at each junction. As a result, using three insertion-type connectors can potentially exceed the transmission-loss budget.

DETAILED DESCRIPTION

The present disclosure describes devices, assemblies, and methods for furcating a fiber optic cable. The term "fiber optic" generally refers to any strand capable of transmitting optic signals. Suitable fiber optic materials include optically transmissive glass or plastic threads. It will be appreciated that several of the details set forth below are provided to describe the following embodiments in a manner sufficient to enable a person skilled in the relevant art to make and use the disclosed embodiments. Several of the details described below, however, may not be necessary to practice certain embodiments of the invention. Additionally, the invention can include other embodiments that are within the scope of the claims but are not described in detail with respect to FIGS. 2-9.

Figure 2:
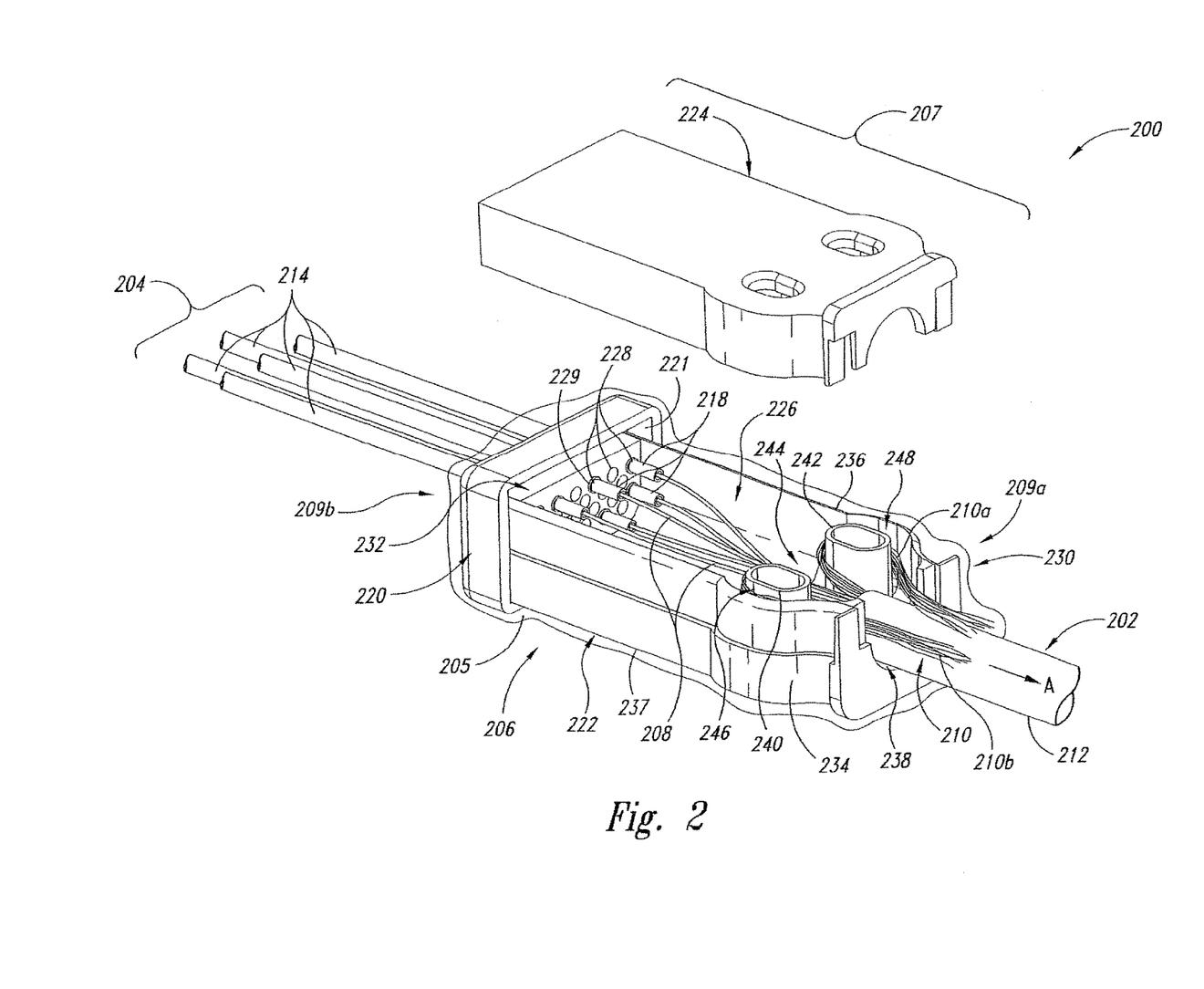
FIG. 2 is a partially exploded isometric view of a furcated cable in accordance with several embodiments of the invention.
Figure 3:
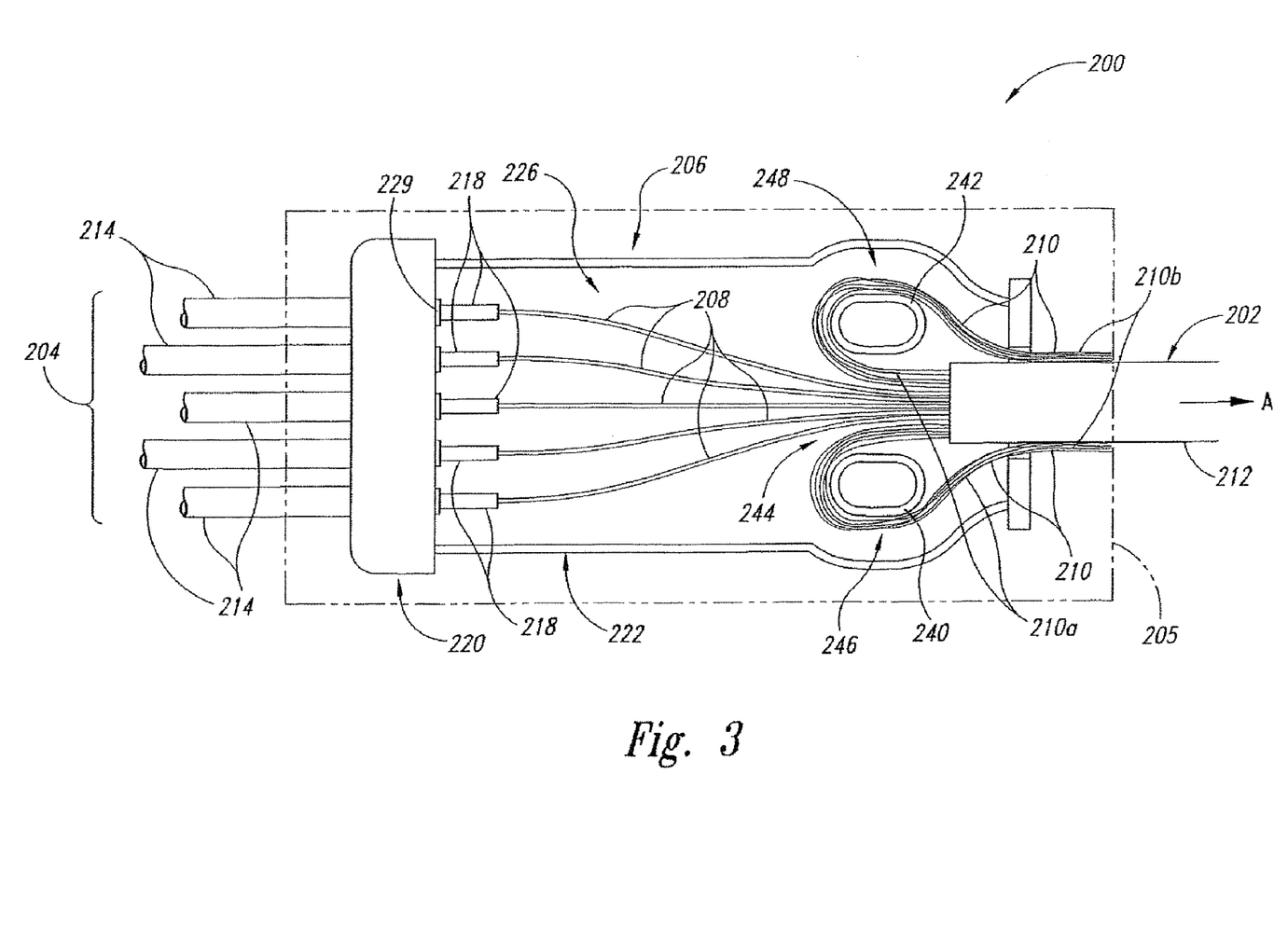
FIG. 3 is a top view of the furcated cable of FIG. 2 illustrating features of the furcated cable in more detail.

FIG. 2 is a partially exploded isometric view of a furcated cable 200 in accordance with an embodiment of the invention. FIG. 3 is a top view of the same furcated cable 200. The furcated cable 200 can include a bundled cable 202 (e.g., a trunkline), furcation tubes 204, and a furcation unit 206 in between the bundled cable 202 and the furcation tubes 204. The furcated cable 200 can further include a plurality of optic fibers 208 that are slidably disposed in the bundled cable 202, the furcation unit 206, and the furcation tubes 204 such that the optic fibers 208 can move in a longitudinal direction.

The bundled cable 202 can include a cable jacket 212 encasing cable filaments 210 and portions of the optic fibers 208. The optic fibers 208 and the cable filaments 210 can extend beyond one end of the cable jacket 212 proximate to the furcation unit 206. The cable jacket 212 can be constructed from plastic, metals, metal alloys, fiberglass, or other suitable materials. The cable filaments 210 can include strength fibers constructed from Kevlar, Nylon, polyester, or other suitable materials. The optic fibers 208 can include single-mode fibers, multimode fibers, index-graded fibers, or a combination of these types of optic fibers. The bundled cable 202 can optionally include other components including, for example, insulating layers (e.g., a plastic sheath), strengthening devices to support the cable jacket 212 (e.g., metal rings or plastic strips), and signal transmission devices (e.g., waveguides, repeaters, etc.).

Individual furcation tubes 204 can include a tube jacket 214, a buffer tube 218 slidably disposed inside the tube jacket 214, and tube filaments 216 (shown in FIG. 5A) between the tube jacket 214 and the buffer tubes 218. The tube filaments 216 at least partially surround a corresponding buffer tube 218. The buffer tube 218 can extend beyond one end of the tube jacket 214 proximate to the furcation unit 206. One optic fiber 208 is inside one buffer tube 218. The tube jackets 214 and buffer tubes 218 can be constructed from plastic, metals, metal alloys, fiberglass, or other suitable materials. The tube filaments can include strength fibers constructed from Kevlar, nylon, polyester, or other suitable materials.

The furcation unit 206 can include a housing 207 or other enclosure having a head 220, a base 222, and a cover 224 that form an interior space 226. The housing 207 has a first end 209a proximate to the bundled cable 202 and a second end 209b proximate to the furcation tubes 204. The head 220 can be a generally rectangular structure having channels 228 configured to receive the furcation tubes 204, a slot 221 configured to receive the base 222 and/or the cover 224. The head 220 can be constructed from plastic (e.g., polycarbonate, polyurethane, etc.), metal, wood, or other suitable materials. In other embodiments, the head 220 can be circular or another shape. Various embodiments of the head 220 are described in more detail below with reference to FIG. 4.

In the embodiment illustrated in FIGS. 2 and 3, individual furcation tubes 204 can also include a fastening member 229 configured to fasten the tube filaments 216 to the individual tube jackets 214, as described in more detail below with reference to FIGS. 5A and 5B. In the illustrated embodiment, the fastening member 229 is also configured to locate individual buffer tubes 218 relative to the head 220 of the furcation unit 206. For example, the fastening member 229 can limit the longitudinal movement of the furcation tubes 204 relative to the head 220.

In the embodiment shown in FIGS. 2 and 3, the buffer tubes 218 extend through the channels 228 and into the interior space 226 of the housing 207. In another embodiment, the buffer tubes 218 can extend into the channels 228 but not into the interior space 226. For example, in one particular embodiment, individual buffer tubes 218 can be generally flush with the fastening member 229 and/or the head 220. In other embodiments, individual buffer tubes 218 can encase one of the optic fibers 208 and be slidably disposed in the bundled cable 202, the housing 207, and one of the furcation tubes 204.

The cover 224 can include features (e.g., channels, notches, holes, etc.) to correspond to the base 222 and the head 220. The cover 224 can be constructed from plastic, metal, wood, or other suitable materials. In the embodiment shown in FIG. 2, the cover 224 cooperates with the base 222 to form an opening 238 for the cable jacket 212 at the first end 209a of the housing 207. In other embodiments, the base 222 or the cover 224 can include the opening 238.

The base 222 can include a first end 230 proximate to the bundled cable 202, a second end 232 proximate to the head 220, a first side wall 234, a second side wall 236, and a bottom wall 237 extending between the first and second ends 230 and 232. The first end 230 can include the opening 238 for receiving the bundled cable 202. The second end 232 of the base 222 can be configured to correspond with the head 220. For example, the second end 232 of the base 222 can include features, including channels, notches, holes, etc., for interfacing with the head 220. The base 222 can be constructed from plastic, metal, wood, or other suitable materials.

In the embodiment shown in FIGS. 2 and 3, the opening 238 has a diameter larger than the outer diameter of the cable jacket 212. As a result, the bundled cable 202 can extend into the interior space 226 of the housing 207 through the opening 238. In another embodiment, the opening 238 can have a diameter slightly smaller than the outer diameter of the cable jacket 212 such that the second end 232 stops the cable jacket 212 from extending into the interior space 226 of the furcation unit 206.

The base 222 further includes a first anchor 240 and a second anchor 242 spaced apart from each other and near the first end 230. In one embodiment, the first and second anchors 240 and 242 are formed integrally with the base 222. For example, in the embodiment shown in FIG. 2, the first and second anchors 240 and 242 are hollow columns with curved surfaces facing the second end 232. The first and second anchors 240 and 242 can extend from the bottom wall 237 of the base 222 and have oval-shaped channels. In other embodiments, the first and second anchors 240 and 242 can be solid structures fixedly attached to the bottom wall 237 of the base 222. For example, the first and second anchors 240 and 242 can be generally cylindrical tubes fixedly attached to the bottom wall 237 of the base 222 using techniques including, for example, welding, friction fitting, mechanical fastening, etc.

The first and second anchors 240 and 242 can define a primary channel 244 between the inner facing walls of the first and second anchors 240 and 242. The first anchor 240 and the first side wall 234 can define a first outer channel 246, and the second anchor 242 and the second side wall 236 can define a second outer channel 248. The optic fibers 208 extend through the primary channel 244 into the buffer tubes 218. The optic fibers 208 are not fixed to the bundled cable 202, the housing 207, or the buffer tubes 218, and thus the optic fibers 208 can slide longitudinally relative to these components. The cable filaments 210 can include a first portion 210a in the interior space 226 and a second portion 210b external to the housing 207 and/or the cable jacket 212. The first portion 210a of the cable filaments 210 is positioned in the primary channel 244 and in the first and second outer channels 246 and 248, thus wrapping around the faces of the first and second anchors 240 and 242 that are nearest to the second end 232. The second portion 210b of the cable filaments 210 extends through the opening 238 to become external to the housing 207 and/or the cable jacket 212. In other embodiments, the cable filaments 210 can be positioned in only one of the first and second outer channels 246 and 248.

The furcated cable 200 can further include at least one layer of molding (e.g., an epoxy 205) enclosing the furcation unit 206. The epoxy 205 can firmly attach the second portion 210b of the cable filaments 210 to the furcation unit 206 and/or the cable jacket 212. In one embodiment, appropriate molding pressure is applied such that the epoxy 205 does not penetrate into the interior space 226 of the furcation unit 206 via the channels 228 and/or the opening 238. As a result, the interior space 226 of the furcation unit 206 is substantially free of the epoxy 205, any other adhesives, or other liquid or gel material, such that the optic fibers 208 can slide longitudinally relative to the cable bundle 202 and the furcation unit 206. In another embodiment, the epoxy 205 can penetrate the interior space 226 partially via the channels 218 and/or the opening 238 but not contact the optic fibers 208. In either embodiment, the optic fibers 208 can slide longitudinally in the interior space 226 of the furcation unit 206.

Several embodiments of the furcated cable 200 can help reduce the risk of damaging the optic fibers 208 during handling processes because the furcation unit 206 can isolate tensile forces from the optic fibers 208. For example, when tension is applied to the cable jacket 212 during pulling (as indicated by arrow A), the epoxy 205 transmits the tension from the cable filaments 210 to the furcation unit 206 via the first and second anchors 240 and 242. The optic fibers 208, however, are not fixed to the furcation unit 206 and can slide longitudinally inside the housing 207 relative to the cable jacket 212, furcation tubes 204, and the furcation unit 206. As a result, the cable jacket 212 and the furcation unit 206 bear substantially all of the tensile forces applied to the cable jacket 212. Consequently, the risk of damaging the fragile optic fibers 208 can be reduced.

Several embodiments of the furcated cable 200 can facilitate arranging a large number (e.g., 24) of furcation tubes in an organized fashion. In one embodiment, the channels 228 at the head 220 are organized into an array with wiring designations (e.g., pin-out markings) to easily organize a large number of furcation tubes. Several embodiments of the furcation unit 206 can also reduce transmission loss through the furcated cable 200. Unlike in insertion-type connectors, the optic fibers 208 of the furcated cable 200 are continuous, i.e., not spliced in the furcation unit 206. As a result, the furcation unit 206 does not incur any appreciable insertion loss caused by such splices.

The furcated cable 200 can have many additional embodiments with different and/or additional features without detracting from the operation of the furcated cable 200. For example, the head 220, the base 222, and/or the cover 224 of the furcation unit 206 can be formed as a unitary structure before assembly. In another example, the furcated cable 200 can include a heat-shrink tube covering the cable filaments 210 external to the cable jacket 212 before the epoxy 205 is applied. The furcated cable 200 can also include an adhesive between the furcation tubes 204 and the head 220 for additional structural integrity. In further embodiments, the furcated cable 200 can include fasteners including, for example, mechanical fasteners, compression fittings, etc., to assemble the furcation unit 206, the bundled cable 202, and the furcation tubes 204 into a furcated cable.

Figure 4:
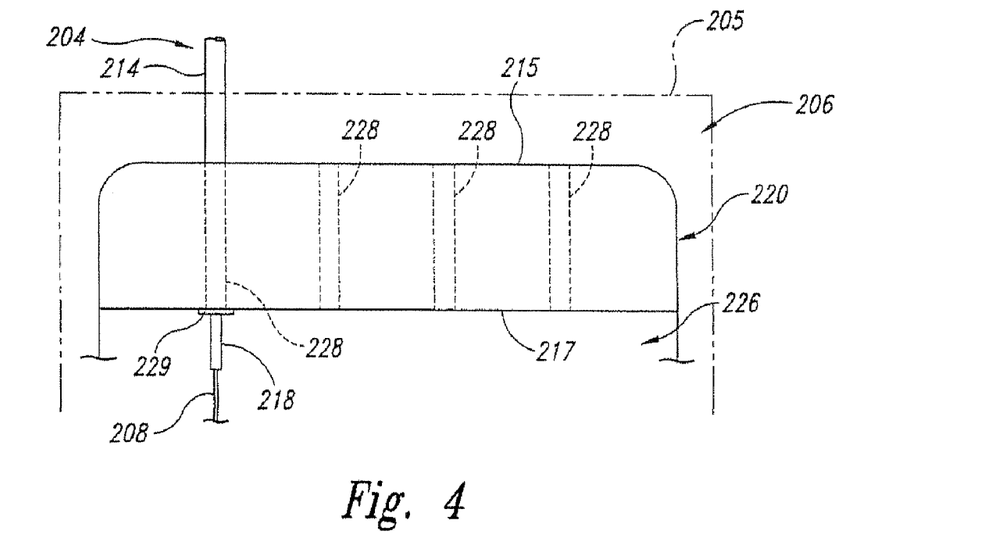
FIG. 4 is a partial top view of a portion of a furcation unit in accordance with an embodiment of the invention.

FIG. 4 is a partial top view of the furcation unit 206 of FIGS. 2 and 3 illustrating the head 220 in more detail. In the illustrated embodiment, only one furcation tube 204 is shown for clarity. The channels 228 can extend from a first surface 215 to a second surface 217 of the head 220. The channels 228 can have a diameter larger than the outer diameter of the tube jacket 214 but smaller than the outside dimension of the fastening member 229. In the illustrated embodiment, the buffer tubes 218 extend through the channels 228 and into the interior space 226. The tube jacket 214 partially extends inside the channel 228 and can be generally flush with the second surface 217. After assembly, the fastening member 229 can firmly attach the tube filaments 216 to the tube jacket 214, as described in more detail below with reference to FIGS. 5A and 5B.

Figure 5A:
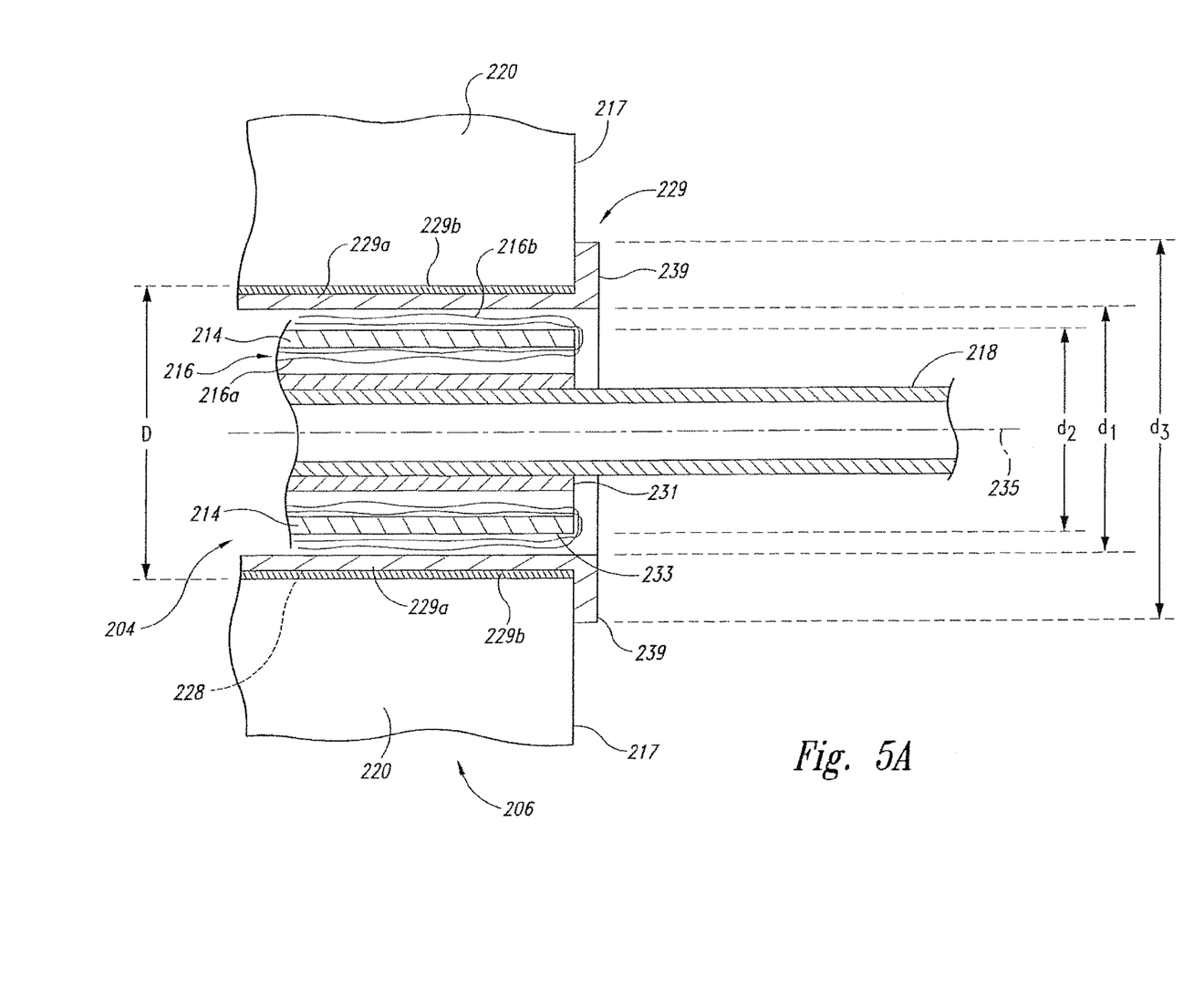
FIG. 5A is a partial cross-sectional view of a portion of a furcation tube in accordance with one embodiment of the invention.
Figure 5B:
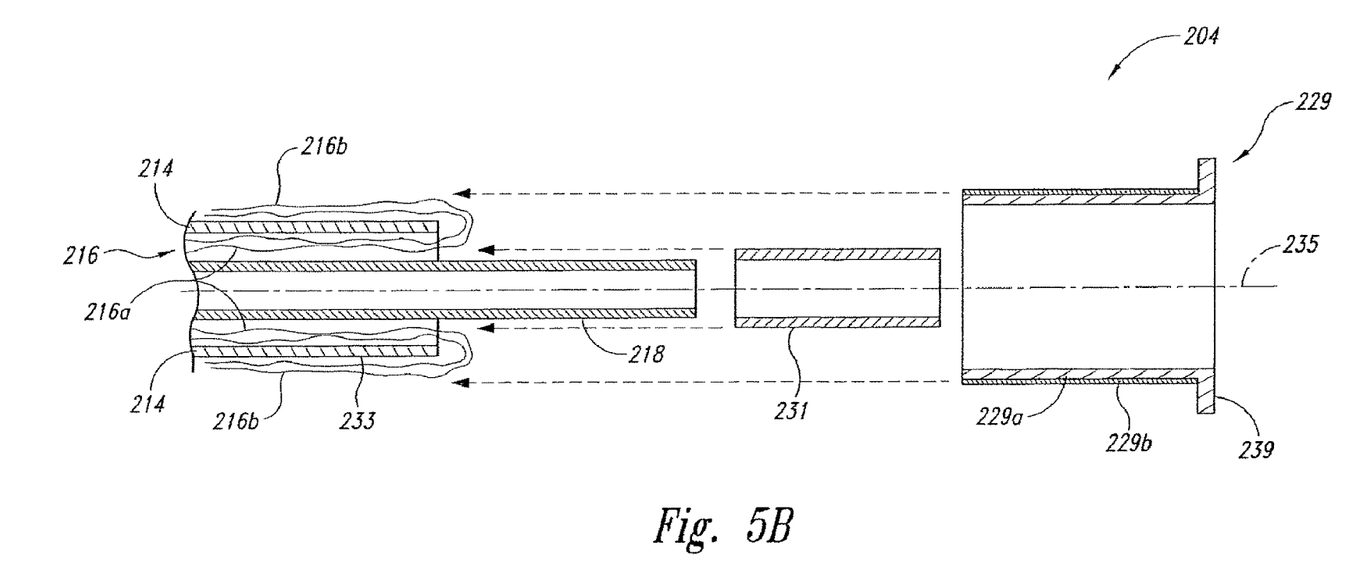
FIG. 5B is an exploded partial cross-sectional view of a portion of the furcation tube in FIG. 5A in accordance with one embodiment of the invention.

FIG. 5A is a partial cross-sectional view of a portion of the furcation tube 204 assembled with the fastening member 229, and FIG. 5B is an exploded partial cross-sectional view of the furcation tube 204 in FIG. 5A. In FIGS. 5A and 5B, the spacing between individual components is exaggerated for illustration purposes. Referring to FIGS. 5A and 5B together, the furcation tube 204 includes a first portion 216a of the tube filaments 216 that extends inside the tube jacket 214 and around the buffer tube 218. A second portion 216b of the tube filaments 216 extends beyond the tube jacket 214 and is positioned between an outside surface 233 of the tube jacket 214 and the fastening member 229. In the illustrated embodiment, the furcation tube 204 can optionally include a support member 231 between the buffer tube 218 and the tube jacket 214. In other embodiments, the support member 231 can be omitted.

In the illustrated embodiment, the fastening member 229 includes a body that has a first tube 229a and a second tube 229b longitudinally extending from a flange 239. The first and second tubes 229a and 229b can be generally cylindrical. The second tube 229b is outside and substantially concentric with the first tube 229a. The first tube 229a can have an inside diameter ("$d_1$") greater than an outside diameter ("$d_2$") of the tube jacket 214, and the second tube 229b can have an outside diameter smaller than an inside diameter ("D") of the channel 228. As a result, the first and second tubes 229a and 229b can fit between the tube jacket 214 and the channel 228. In certain embodiments, the first and second tubes 229a and 229b can be constructed from the same material (e.g., stainless steel, copper, or aluminum). In other embodiments, the first and second tubes 229a and 229b can be constructed from different materials. For example, the first tube 229a can be constructed from a metal (e.g., copper), or a polymeric material (e.g., Teflon). The second tube 229b can be constructed from another metal (e.g., stainless steel) or other suitable material that may be plastically deformed to compress at least the first tube 229a. In further embodiments, the second tube 229b may be omitted.

The flange 239 can extend radially outward from an axis 235 of the buffer tube 218 to have an outside dimension greater than the inside diameter D of the channel 228. For example, the flange 239 can include a ring with an outside diameter ("$d_3$") greater than the inside diameter D of the channel 228. In the illustrated embodiment, the first tube 229a and the flange 239 have the same inside dimension. Optionally, in certain embodiments, the flange 239 can also extend radially inward toward the axis 235 to have an inside dimension smaller than the outside diameter $d_2$ of the tube jacket 214. In further embodiments, the flange 239 can have a square shape, a rectangular shape, an oval shape, and/or other suitable shapes. In yet further embodiments, the flange 239 can be omitted.

The optional support member 231 can include a generally cylindrical tube constructed from a metal, a metal alloy, a polymeric material, glass, and/or other material with sufficient rigidity. In certain embodiments, the support member 231 can surround but be unattached to the buffer tube 218. In other embodiments, the support member 231 can be attached to the buffer tube 218 by compression, adhesives, and/or other suitable mechanisms. In the illustrated embodiment, the support member 231 is generally flush longitudinally with the second surface 217 of the head 220. In other embodiments, the support member 231 can be recessed in the channel 228 compared to the first and/or second surfaces 215 and 217 of the head 220.

The fastening member 229 can secure the second portion 216b of the tube filaments 216 to the outside surface 233 of the tube jacket 214. In certain embodiments, the first tube 229a of the fastening member 229 can compress the second portion 216b of the tube filaments 216 against the tube jacket 214 with sufficient force to prevent the second portion 216b of the tube filaments 216 from moving relative to the tube jacket 214. In these embodiments, the optional support member 231 can have sufficient rigidity to protect the buffer tube 218 from being crushed by the compression force, and in turn protect the optic fiber 208 (FIG. 4) disposed in the buffer tube 218. In other embodiments, the fastening member 229 can secure the second portion 216b of the tube filaments 216 to the tube jacket 214 with a clamp, an adhesive, and/or other suitable fastening mechanisms.

The fastening member 229 can also position the furcation tube 204 relative to the head 220 of the furcation unit 206. In certain embodiments, the furcation tube 204 can extend into the channel 228 from the second surface 217 until the flange 239 abuts the second surface 217. The flange 239 can stop the furcation tube 204 from moving longitudinally any farther into the channel 228 because the outside diameter $d_3$ of the flange 239 is larger than the inside diameter D of the channel 228. In other embodiments, the fastening member 229 can also include positioning pins, set screws, and/or other suitable positioning components.

In certain embodiments, a process for assembling the furcated cable 200 of FIG. 1 can include removing a portion of the tube jacket 214 from individual furcation tubes 204 to expose a desired length (e.g., about 0.7 inches to about 2 inches) of the buffer tubes 218 and the tube filaments 216. This process can also include sliding the optional support member 231 over the buffer tube 218 to be inside the tube jacket 214, as shown in FIG. 5A. In certain embodiments, sliding the support member 231 can include positioning the support member 231 relative to the buffer tube 218 and/or the tube jacket 214 by friction with at least one of the buffer tube 218, the tube jacket 214, and the tube filaments 216. In other embodiments, sliding the support member 231 can include attaching the support member 231 to at least one of the buffer tube 218 and the tube jacket 214 via compression, expansion, adhesion, and/or other suitable fastening mechanisms.

In certain embodiments, a subsequent stage of the process can include trimming the second portion 216b of the tube filaments 216 to have a desired length (e.g., about 0.2 inches to about 1.0 inches). For example, in certain embodiments, the second portion 216b of the tube filaments 216 can be trimmed to have a length no greater than that of the fastening member 229. In other embodiments, the second portion 216b of the tube filaments 216 can be trimmed to have a length greater than that of the fastening member 229. In further embodiments, this trimming stage can be omitted, and the second portion 216b of the tube filaments 216 can have its original length.

A subsequent stage of the process can include bending the second portion 216b of the tube filaments 216 to be generally aligned with the outside surface 233 of the tube jacket 214. Another stage of the process can include fastening the second portion 216b to the outside surface 233 of the tube jacket 214 with the fastening member 229. In certain embodiments, fastening the second portion 216b to the tube jacket 214 includes sliding the fastening member 229 over the tube jacket 214, as shown in FIG. 5B, and crimping the second tube 229b of the fastening member 229 with a crimper. In a particular embodiment, a suitable crimper includes a 2-mm round crimper. In other embodiments, fastening the second portion 216b to the tube jacket 214 can include attaching the second portion 216b to the tube jacket 214 mechanically, adhesively, and/or using other suitable fastening mechanisms.

Figure 6:
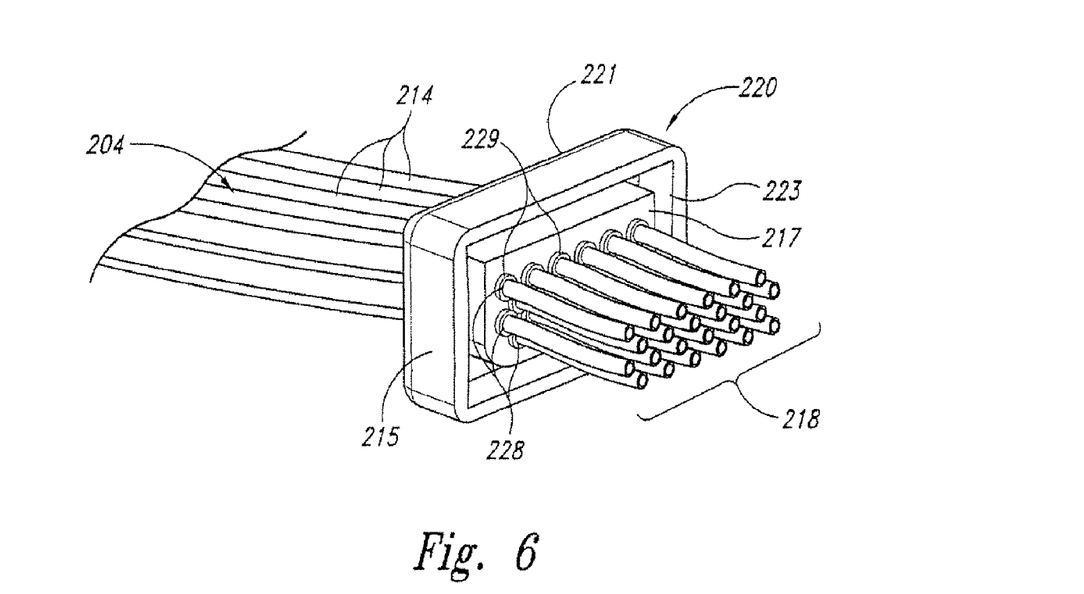
FIG. 6 is a partial isometric view of a furcation unit during a stage in an assembly process in accordance with another embodiment of the invention.

As illustrated in FIG. 6, another stage of the process can include sliding the furcation tubes 204 into individual channels 228 from the second surface 217 to the first surface 215 until the fastening member 229 stops the furcation tube 204 from moving any farther. Each of the channels 228 receives one furcation tube 204. In certain embodiments, the furcation tubes 204 can be held in the channels 228 by friction. In other embodiments, the exposed tube filaments 216 and the tube jacket 214 can be secured with a shrink wrap (not shown) and/or other suitable fasteners.

Figure 7:
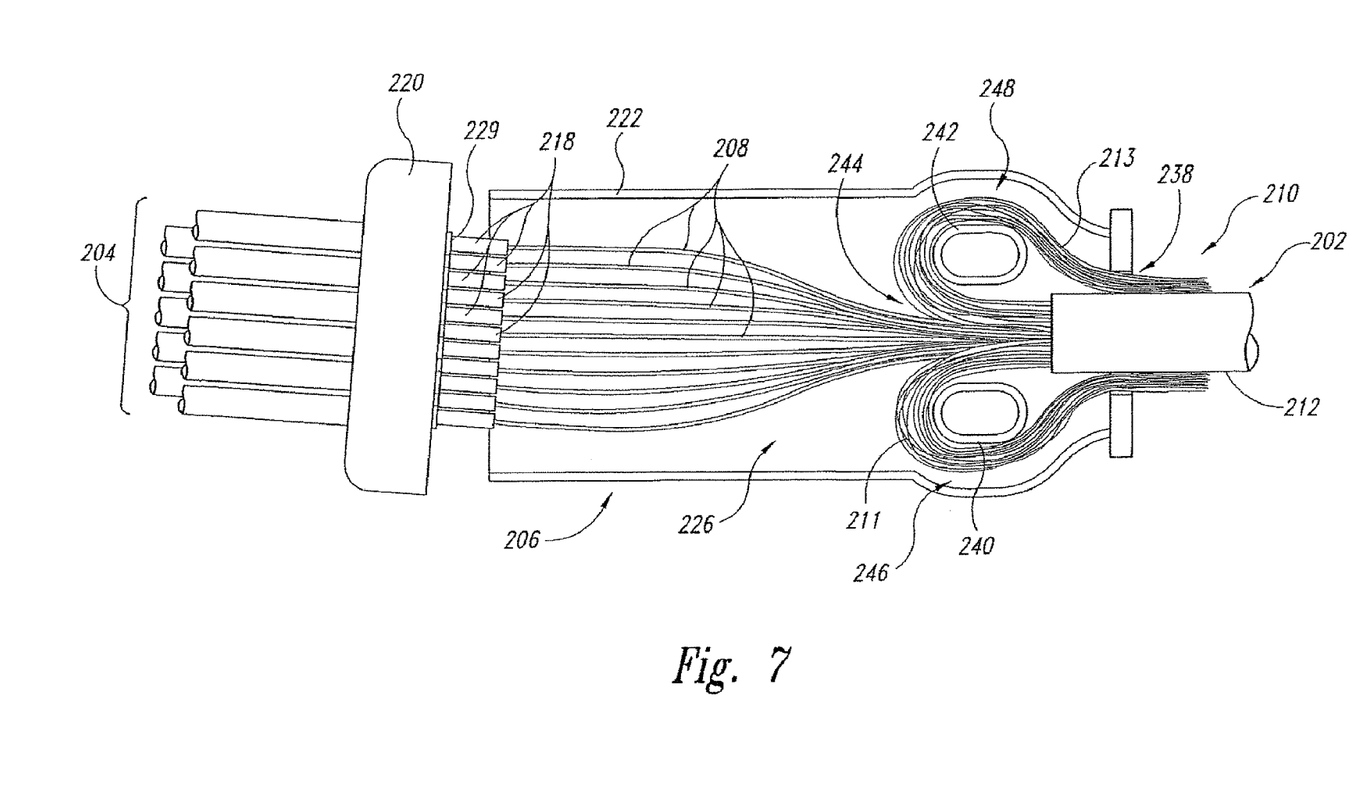
FIG. 7 is a partial isometric view of a furcation unit during a stage in an assembly process in accordance with another embodiment of the invention.
Figure 8:
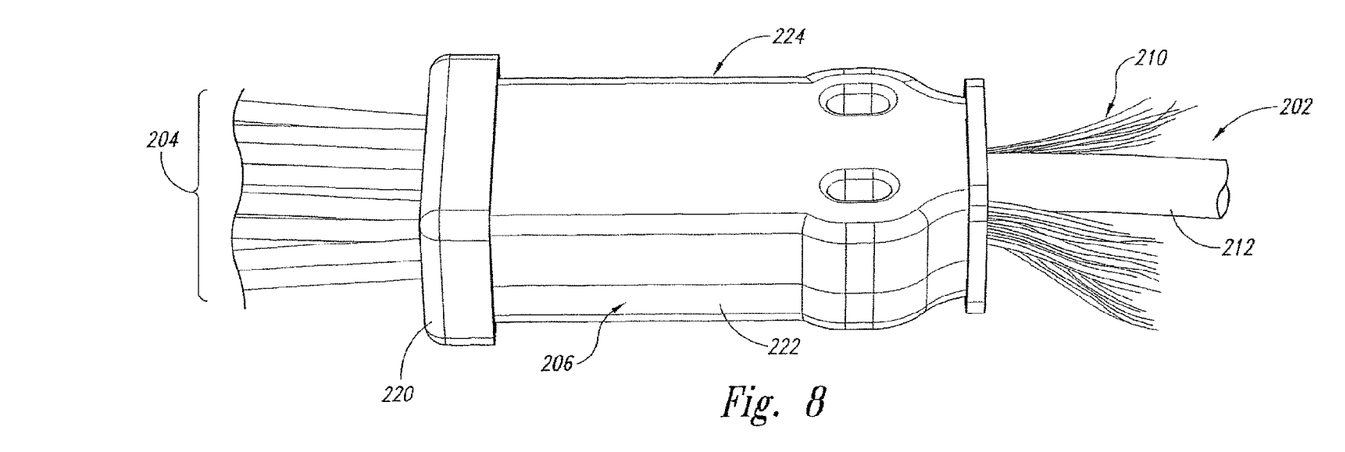
FIG. 8 is a partial isometric view of a furcation unit during a stage in an assembly process in accordance with another embodiment of the invention.

Another stage of the process can include removing a portion of the cable jacket 212 to expose a desired length of the optic fibers 208 and the cable filaments 210. As illustrated in FIG. 7, each of the optic fibers 208 is inserted in one of the corresponding buffer tubes 218 extending from the head 220 via the primary channel 244 and the internal space 226 of the furcation unit 206. A first portion 211 of the exposed cable filaments 210 can be wrapped around the first anchor 240 and extended beyond the opening 238 to become external to the cable jacket 212. A second portion 213 of the exposed cable filaments 210 can be wrapped around the second anchor 242 and extended beyond the opening 238 to become external to the cable jacket 212. The cable filaments 210 external to the cable jacket 212 can be at least partially aligned with the bundled cable 202. Then the base 222 can be inserted into the head 220. The cover portion can then be combined with the head 220 and the base 222 to form the furcation unit 206 as illustrated in FIG. 8.

Figure 9:
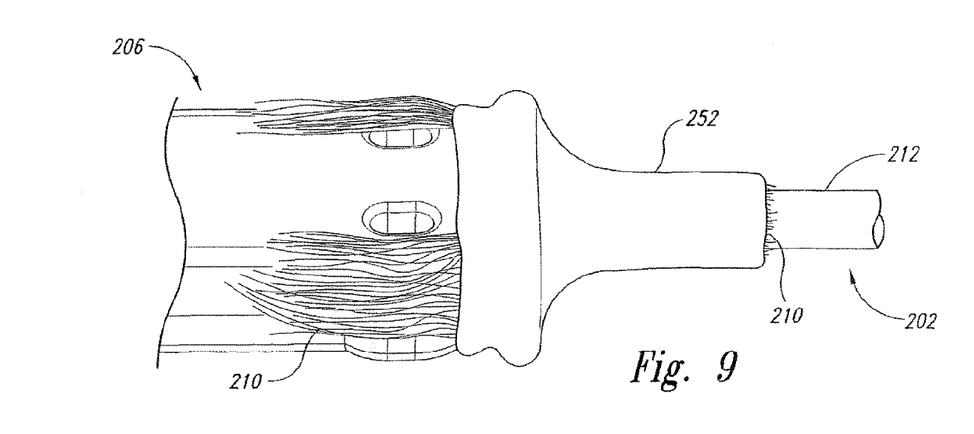
FIG. 9 is a partial isometric view of a furcation unit during a stage in an assembly process in accordance with another embodiment of the invention.

As illustrated in FIG. 9, in one embodiment, a heat-shrink tube 252 can be disposed at least partially over the furcation unit 206 and the bundled cable 202. The heat-shrink tube 252 can at least partially fasten the cable filaments 210 to the cable jacket 212 before heat molding. In the embodiment shown in FIG. 9, a portion of the cable filaments 210 extends from the heat-shrink tube 252 to cover a portion of the furcation unit 206. In other embodiments, the heat-shrink tube 252 can substantially cover the cable filaments 210 external to the cable jacket 212. The epoxy 205 (not shown) can then be disposed over the furcation unit 206 and at least a portion of the bundled cable 202 and the furcation tubes 204. In one embodiment, at least one layer of epoxy 205 can be disposed. In another embodiment, other means of assembly can be used including, for example, mechanical fasteners, compression fittings, etc.

Unless the context clearly requires otherwise, throughout the description and the claims, the words "comprise," "comprising," and the like, are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The above Detailed Description of embodiments of the invention are not intended to be exhaustive or to limit the invention to the precise form disclosed above. Although specific embodiments of, and examples for, the invention are described above for illustrative purposes, various equivalent modifications are possible within the scope of the invention, as those skilled in the relevant art will recognize. For example, when steps are presented in a given order, alternative embodiments may perform steps in a different order. The various embodiments described herein can be combined to provide further embodiments.

In general, the terms used in the following claims should not be construed to limit the invention to the specific embodiments disclosed in the specification, unless the above Detailed Description explicitly defines such terms. Although certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What is claimed is:

1. A fiber optic cable assembly, comprising:
   a housing having a first end, a second end, and an interior space between the first and second ends, the housing having an opening at the first end and a plurality of channels at the second end;
   a plurality of furcation tubes in corresponding channels, the furcation tubes individually including a tube jacket, a buffer tube, and tube filaments having a first portion in the tube jacket and a second portion extending beyond the tube jacket, and wherein the individual furcation tubes include a fastening member at least partially in the channel, the fastening member fastening the second portion of the tube filaments to an outside surface of the tube jacket;
   a bundled cable having a cable jacket and cable filaments in the cable jacket, one end of the bundled cable extends into the interior space through the opening, wherein a portion of the cable filaments extends beyond the end of the cable jacket into the interior space; and
   a plurality of optic fibers in the bundled cable, the housing, and the individual buffer tubes.

2. The fiber optic cable assembly of claim 1 wherein the fastening member has a first diameter greater than an outside diameter of the tube jacket and smaller than an inside diameter of the individual channels, and wherein the fastening member further includes a flange having an outside diameter greater than the inside diameter of the individual channels, and wherein the individual furcation tubes include a support member between the buffer tube and the tube jacket, the support member being generally cylindrical and having an inside diameter greater than an outside diameter of the buffer tube and smaller than an inside diameter of the tube jacket.

3. The fiber optic cable assembly of claim 1 wherein the second portion of the tube filaments extends beyond the tube jacket and is generally aligned with the outside surface of the tube jacket.

4. The fiber optic cable assembly of claim 1 wherein the fastening member compresses the second portion of the tube filaments against the outside surface of the tube jacket.

5. The fiber optic cable assembly of claim 1 wherein the second portion of the tube filaments is at least partially in the individual channels.

6. A fiber optic cable assembly, comprising:
   a furcation unit having a head with a plurality of channels, a base having an opening and an anchor, and a cover coupled to the base and the head to define an interior space;
   a bundled cable having a cable jacket and cable filaments inside the cable jacket, a portion of the cable filaments extending beyond the cable jacket, around the anchor, and out of the interior space via the opening;
   a plurality of furcation tubes individually disposed in the channels, the individual furcation tubes include a fastening member at an end proximate to the furcation unit, the fastening member including a body extending through a corresponding channel and a flange extending from the body and abutting the head; and
   a plurality of optic fibers disposed in the bundled cable, the base, and one of the channels of the furcation unit, and inside one of the furcation tubes.

7. The fiber optic cable assembly of claim 6 wherein the channels extend from a first surface to a second surface of the head, and wherein the body surrounds at least a portion of the furcation tube and extends between the first and second surfaces of the head, and further wherein the flange abuts one of the first and second surfaces of the head.

8. The fiber optic cable assembly of claim 6 wherein the channels extend from a first surface to a second surface of the head, and wherein the body surrounds at least a portion of the individual furcation tubes and extends between the first and second surfaces of the head, and further wherein the flange abuts the second surface of the head and prevents the individual furcation tubes from moving in a direction from the second surface to the first surface.

9. The fiber optic cable assembly of claim 6 wherein the individual furcation tubes include a tube jacket and tube filaments including a first portion in the tube jacket and a second portion extending beyond the tube jacket, and wherein the body fastens the second portion of the tube filaments to the tube jacket.

10. The fiber optic cable assembly of claim 6 wherein the individual furcation tubes include a tube jacket, a buffer tube in the tube jacket, and tube filaments having a first portion in the tube jacket and a second portion extending beyond the tube jacket, and wherein the individual furcation tubes further include a support member between the tube jacket and the buffer tube, and further wherein the body applies a compression force to the second portion of the tube filaments against the tube jacket while the support member protects the buffer tube from the compression force.

11. The fiber optic cable assembly of claim 6 wherein the individual furcation tubes include a tube jacket, a buffer tube in the tube jacket, and tube filaments having a first portion in the tube jacket and a second portion extending beyond the tube jacket, and wherein the individual furcation tubes further include a support member between the tube jacket and the buffer tube, and further wherein the body of the fastening member is generally concentric with the support member.

12. The fiber optic cable assembly of claim 11 wherein the support member includes a generally cylindrical tube.

13. The fiber optic cable assembly of claim 11 wherein the support member is constructed from a material with sufficient rigidity to protect the buffer tube from the compression force.

14. A method of furcating a bundled cable having a plurality of optic fibers in a cable jacket into a plurality of furcation tubes, comprising:
   removing a desired length of a tube jacket from individual furcation tubes to partially expose buffer tubes and tube filaments;
   fastening the exposed portion of the tube filaments to an outside surface of the tube jacket with a fastening member;
   sliding individual furcation tubes along with the fastening members into individual channels of a furcation unit until the fastening members stop the furcation tubes from moving farther into the channels; and
   extending the individual optic fibers from the bundled cable through the furcation unit and the individual furcation tubes.

15. The method of claim 14 wherein fastening the exposed portion of the tube filaments to the outside surface of the tube jacket includes fastening the exposed portion of the tube filaments to the outside surface of the tube jacket via compression.

16. The method of claim 14 wherein the individual furcation tubes include a buffer tube in the tube jacket, and wherein fastening the exposed portion of the tube filaments to the outside surface of the tube jacket includes applying a compression force to the exposed portion of the tube filaments against the outside surface of the tube jacket and protecting the buffer tube against the compression force with a support member between the buffer tube and the tube jacket.

17. A cable assembly, comprising:
- a housing having a first end, a second end, and an interior space between the first and second ends, the housing having an opening at the first end and a plurality of channels at the second end;
- a plurality of furcation tubes in corresponding channels, the individual furcation tubes including a tube jacket, a buffer tube at least partially in the tube jacket, and tube filaments having a first portion between the tube jacket and the buffer tube and a second portion extending beyond the tube jacket;
- a bundled cable having a cable jacket and cable filaments in the cable jacket, one end of the bundled cable extending into the interior space through the opening, wherein a portion of the cable filaments extends beyond the end of the cable jacket into the interior space;
- a plurality of optic fibers in the bundled cable, the housing, and the individual buffer tubes; and
- means for fastening the second portion of the tube filaments to an outside surface of the tube jacket.

18. The cable assembly of claim 17, further comprising means for positioning the individual furcation tubes relative to the housing.

19. The cable assembly of claim 17 wherein means for fastening include means for applying a compression force to the second portion of the tube filaments, and wherein the cable assembly further includes means for protecting the individual optic fibers from the compression force.

* * * * *